March 6, 1945. J. KANTOR 2,370,969
CONTAINER FEED FOR FILLING MACHINE
Filed April 2, 1942
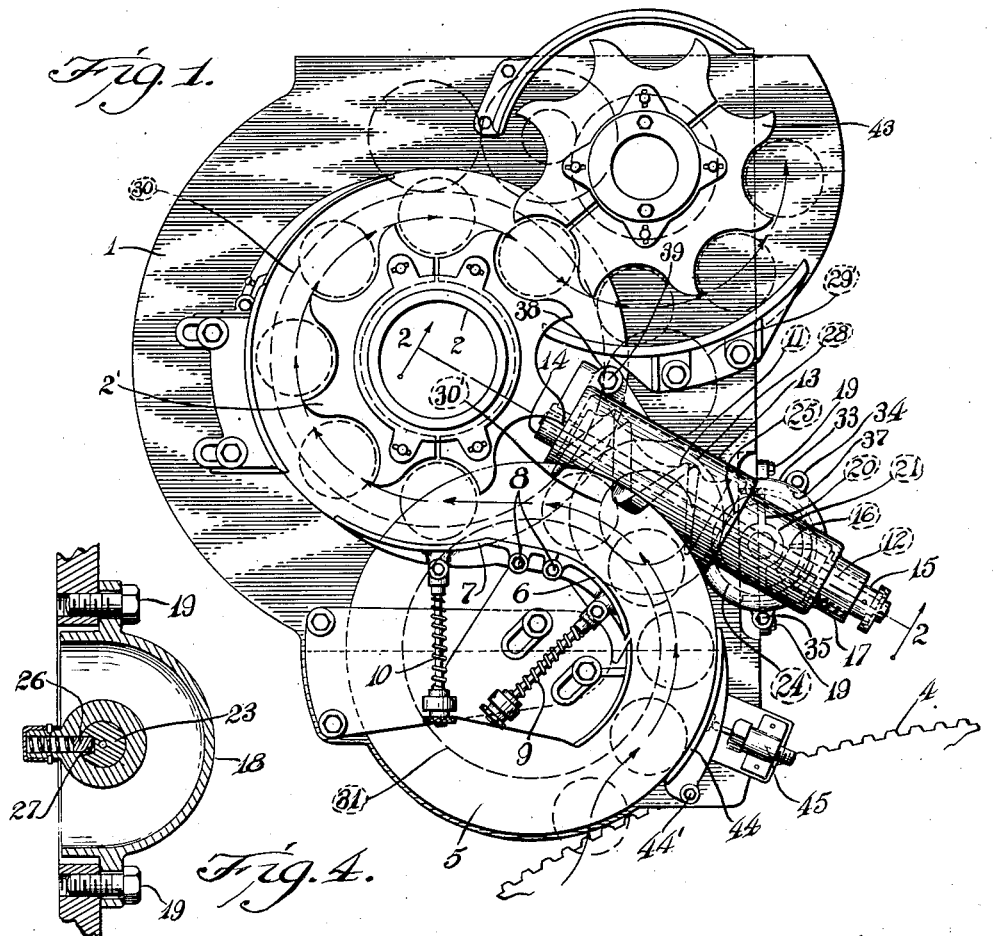
Fig. 1.
Fig. 4.
Fig. 3.
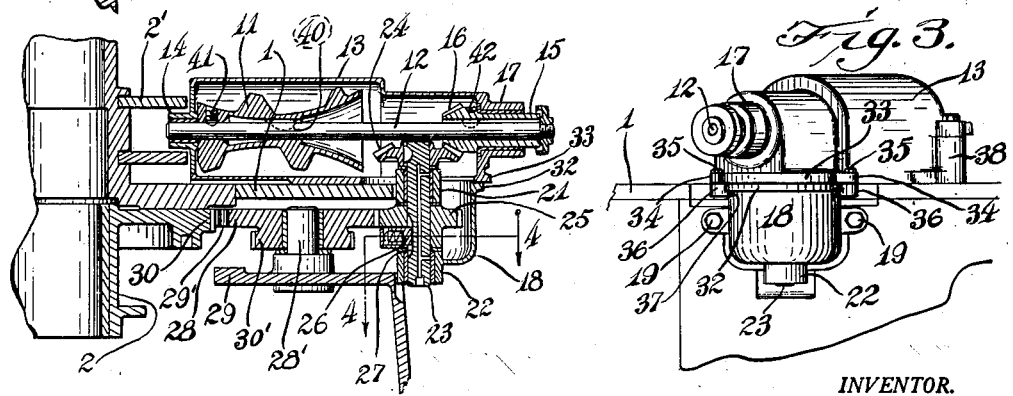
Fig. 2.
INVENTOR.
JAMES KANTOR,
BY
Hood & Hahn
ATTORNEYS Patented Mar. 6, 1945

2,370,969

UNITED STATES PATENT OFFICE 2,370,969

CONTAINER FEED FOR FILLING MACHINES

James Kantor, Chicago, Ill., assignor to The Liquid Carbonic Corporation, Chicago, Ill., a corporation of Delaware Application April 2, 1942, Serial No. 437,383

6 Claims. (Cl. 198—22)

The present invention relates to improvements in feeding mechanism for container handling apparatus and particularly to bottle handling apparatus.

It is one of the objects of my invention to provide a positive feed for receiving the bottles from a delivery mechanism and transferring them to a bottle handling apparatus, such, for instance, as a crowning apparatus in a positive manner and a definite spaced relation.

More specifically, it is an object of my invention to provide a screw feed which will deliver the bottles in the radial direction toward the carrier mechanism of the bottle handling apparatus.

A further object of my invention is to provide a screw feed attachment which may be readily applied to the present type of apparatus now commercially on the market, without modification of this apparatus.

For the purpose of disclosing my invention, I have illustrated an embodiment thereof in the accompanying drawing in which:

Fig. 1 is a plan view of the table of a bottle crowning apparatus now in commercial use showing the application thereto of my improved feed mechanism;

Fig. 2 is a longitudinal sectional view taken on the line 2, 2 of Fig. 1;

Fig. 3 is a side elevation showing means for attaching my feed mechanism to the crowner table; and Fig. 4 is a detail section on line 4, 4 of Fig. 2.

In the embodiment illustrated, I have shown so much of a commercial type of crowning machine as is necessary for the understanding of my invention. In this structure, on a suitable base, there is provided a table 1 through which is projected a hollow rotary shaft 2 carrying, at its upper end, a plurality of bottle crowning devices and provided with a carrying star 2', which rotates above the table and moves the delivered bottles in a circular path during the operation of the crowner mechanisms.

The bottles are transferred from, in the specific embodiment illustrated, a filling machine, the spider gear ring 4 of which only is illustrated, by the means of a rotating disc 5 rotating above the top of the table 1. Coincidental with the axis of the disc 5 are arranged suitable bottle guides 6, which merge into a bottle guide 7 coincidental with the axis of the shaft 2. These guides are preferably hinged at 8, 8 and are biased in their guiding position by suitable springs 9 and 10 so that in event of a jam of the bottles, the guides can give slightly to prevent breaking of the bottles.

Extending radially from the conveyor star 2 is a worm screw 11, which, it will be noted, tapers from its enlarged ends toward the center. This worm screw 11 is arranged radially with respect to the conveyor star 2 and is mounted on a radially disposed shaft 12 carried in a housing 13 which housing is open on its side toward the feed disc 5. One end of the shaft 12 is mounted in a bearing 14 in the inner end of the housing and the opposite end of the shaft is keyed within a hub 15 of a bevel gear 16 which hub operates in a bearing 17 at the opposite end of the housing.

Mounted beneath the housing 13 is a gear housing 18 which is bolted as at 19, 19 to the side of the base supporting the table 1. This housing is provided at its top with webs 20 carrying a bearing 21 and at its bottom with a bearing 22. In these bearings is mounted a vertically disposed shaft 23 carrying, at its top, a bevel gear 24 meshing with and driving the bevel gear 16. Likewise, mounted on the shaft 23 is a driving pinion 25 which is adapted to drive the shaft 15 through the medium of an overload clutch comprising a spring pressed beveled pawl member 26 in the hub of the pinion 25 and adapted to engage in a bevel slot 27 in the shaft 23. This pinion 25 is driven from a gear 28 mounted on a stub shaft 28' supported on a platform 29 in the table base. This gear 28 in turn is driven from an intermediate gear 29' also supported on the platform 29. The gear 29' in turn is driven from a gear 30 mounted on the hollow shaft 2 below the table top. Also mounted on stub shaft 28' below the gear 28 is a gear 30' fastened to or integral with the gear 28. This gear drives a gear 31 on the shaft of the disc 5 so that the disc is driven from the shaft 2 and from the same power take-off, the shaft 23 is likewise driven.

The gear housing is arcuate in shape and is provided near its top with an annular flange 32 on which is adapted to rest the annular flange 33 on the bottom of the rear portion of the housing 13. This flange 33, at suitable intervals, is provided with ears 34 through which pass bolts 35 adapted to secure clamps 36 in position. These clamps are provided with inwardly extending flanges 37 which engage under the flange 32 for clamping the housing 13 to the housing 18. At the same time, by loosening the bolts 35, the clamps 36 are sufficiently loosened to permit the housing 13 to swing on the axis of the shaft 23. For maintaining the housing 18 in its fixed and normal position, the housing 13 is provided with a web 38 through which is adapted to pass a bolt 39 adapted to screw into the table top so that when the housing and the feed screw 11 are in normal position, they are rigidly held.

The feed screw is provided, in its inner bearing surface, with a slot adapted to slidably receive a key 40 so that the screw will be drivingly keyed to the shaft 12 and the feed screw is held against longitudinal displacement by a set screw 41 passing through the feed screw and biting into the shaft 12. The shaft 12 is likewise keyed to the hub 15 of the gear 16, which hub is held against longitudinal displacement, to the right looking at Fig. 4, by a shoulder 42 forming part of a bevel gear 16.

During the operation of the apparatus, the bottles are received from the filling machine and take the course shown in dotted lines. They are transferred from the filling machine to a rotating disc 5 which, rotating counter-clockwise, looking at Fig. 1, will carry the bottles into a position to be forced into the screw 11. This screw, due to its rotative movement, in a clockwise direction, will positively feed the bottles in a position to be picked up by the carrier star 2 of the crown mechanism. After the crowns have been applied to the bottles, they are again picked up by the outfeed star 43 which removes the bottles from the crowner and transfers them to suitable conveyor mechanism or to a position where they may be removed by the operator.

The crowning mechanism is adapted to handle bottles of different sizes, that is, pint sizes, quart sizes, and the like. However, in order to handle bottles of different sizes, it is necessary to use a different size feed screw 11. If it becomes necessary to change from one size feed screw to another, all that is required is to release the screw 41 which will then permit the shaft 15 to be pulled out through the rear end of the housing from the feed screw. The feed screw can then be removed from the housing through its open side and a new or different sized feed screw inserted. The shaft 12 can then be reinserted in the new feed screw and the bolt 41 of the new feed screw tightened so that the parts will be ready for operation. Due to the fact that the rear end of the shaft 12 is positioned quite close to the spider gear 4 of the filling machine, there is normally not sufficient clearance to permit the shaft to be pulled all the way out for releasing the screw 11. Therefore, when it is desired to change screws, the bolt 39 is removed and the clamping bolts 35 loosened. Under these circumstances, the entire housing 13 may be swung on the axis of the shaft 23 toward the axis of the disc 5 so that the shaft 11 will clear the spider gear 4 when the shaft 12 is pulled out.

In addition to the guides 6 and 7, I provide a hinge guide 44 hinged at 44' and adapted to operate a control valve 45 controlling an air pressure clutch for connecting the driving mechanism of the filling machine with its driving motor. In event the crowning apparatus is driven a little slower than the bottle filling machine, there would be a tendency for the bottles to crowd up at the point they enter the feed screw and establish a jam to prevent a feed to the filling machine. Under these circumstances, the bottle guide 44 would be swung on its pivot operating the valve 45 to disconnect the air controlled clutch, thus disconnecting the filling machine from its driving mechanism and stopping the same or, by causing a slippage of the driving clutch, slow down the filling machine. This, of course, would prevent breaking the bottles.

Furthermore, due to the swinging movement of the guides 6 and 7 and particularly the guide 6, if, by chance, a bottle while being fed to the screw 11 from the disc 5, should strike the thread of the screw instead of within the thread of this screw, the guide 6 will swing on its pivot and permit the bottle to slide into its correct position.

I claim as my invention:

1. The combination with a bottle handling machine including a rotary star dial for moving the containers through the path of said machine, a feeding screw larger in diameter at each end and tapering toward the center extending radially with respect to said star and receiving the containers in spaced relation to said star dial, and a rotary transfer dial for receiving and delivering the bottles to said screw, said screw being in tangential relation to said transfer dial.

2. The combination with a container handling machine including a rotating star dial for moving the containers through the path of the machine, a feed disk associated with said star dial, of a housing extending radially of said star dial and having a side opening adjacent to said disk, bearings in the opposite ends of said housing, a bevel gear having a hub journal in the outer bearing of said housing, a shaft extending through said hub and having its opposite end journaled in the bearing in the inner end of said housing, a feed screw carried by said shaft within said housing, said feed screw being detachably and drivingly connected with said shaft, said shaft being detachably and drivingly connected with said beveled gear hub whereby said shaft may be axially removed through the end of said housing and means for driving said beveled gear.

3. The combination with a container handling machine including a rotating star dial for moving the containers through the path of said machine and a rotating feeding disk for said dial, of an elongated housing extending radially of said dial having an open side adjacent to said feeding disk, bearings in the opposite ends of said housing, a bevel gear journaled in the outer bearing, a shaft extending through said bevel gear, a bevel gear in said housing meshing with said first mentioned bevel gear, a feeding screw detachably and drivingly connected with said shaft and carried thereby within said housing, a detachable driving connection between said first mentioned bevel gear and said shaft whereby said shaft may be axially removed through the hub of said gear, a support for said housing and means for swingably moving said housing adjacent its outer end on said support.

4. The combination with a container handling machine including a table, a vertically extending driving shaft for said machine extending through said table, a rotating star dial carried by said shaft and disposed above said table, and a driving gear carried by said shaft and disposed below said table, of a housing arranged above said table and extending radially of said star dial, a driving shaft mounted within said housing having a feed screw thereon, a bevel gear drivingly connected with said shaft, a vertical shaft mounted adjacent the edge of said table having a bevel gear meshing with said first bevel gear, said housing being horizontally swingable on the axis of said vertical shaft and an idler gear disposed beneath said table and meshing with the driving gear of said vertical shaft and with the driving shaft gear whereby said feeding screw is synchronously driven with said star dial.

5. The combination with a container handing machine including a table, a vertically extending driving shaft for said machine extending through said table, a rotary star dial carried by said shaft disposed above said table and a driving gear carried by said shaft and disposed below said table, of a housing disposed above said table and radially of said star dial, a shaft journaled in said housing having a feed screw thereon and driven thereby, a beveled gear drivingly connected to said feed screw shaft, a vertically disposed shaft mounted adjacent to the edge of said table and having a beveled gear meshing with said first mentioned beveled gear, a gear on said shaft and an over-load clutch drivingly connecting said last mentioned gear with said last mentioned shaft and an idler gear mounted beneath said table and meshing respectively with the gears on said two vertically extending shafts.

6. The combination with a container handling machine including a table, a vertically extending driving shaft for said machine extending through said table, a rotary star dial carried by said shaft and disposed above said table, and a driving gear carried by said shaft and disposed below said table, of a housing open on its inner and upper faces mounted adjacent the edge of said table and extending below the plane of said table, bearings in said housing, a vertically disposed shaft mounted in said bearings, a beveled gear mounted in the upper end of said second mounted shaft and a driving gear mounted thereon below the plane of said table, a driving train between said last mentioned driving gear and the driving gear of the star dial shaft, a horizontally disposed housing normally radially disposed with respect to the star dial and swingable in a horizontal plane on the first mentioned housing, a shaft carried in said horizontally disposed housing, a beveled gear drivingly meshing with said first mentioned beveled gear and a feeding screw carried by said shaft within said housing.

JAMES KANTOR.